Oct. 2, 1934.              A. T. POTTER                1,975,372
                         WINDSHIELD FRAME
                         Filed May 19, 1932
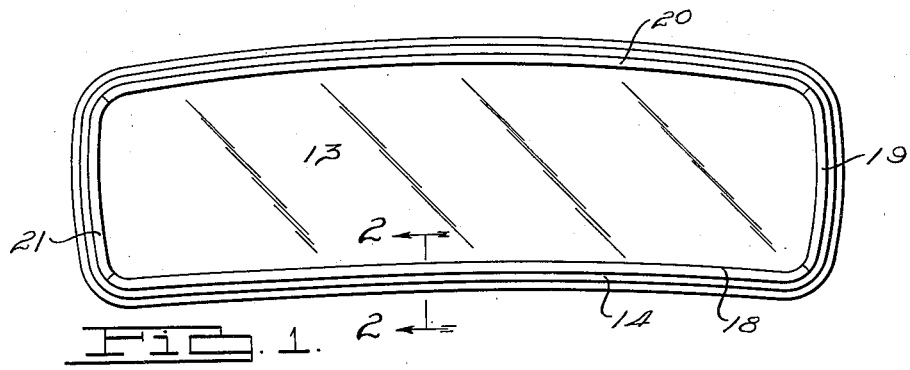
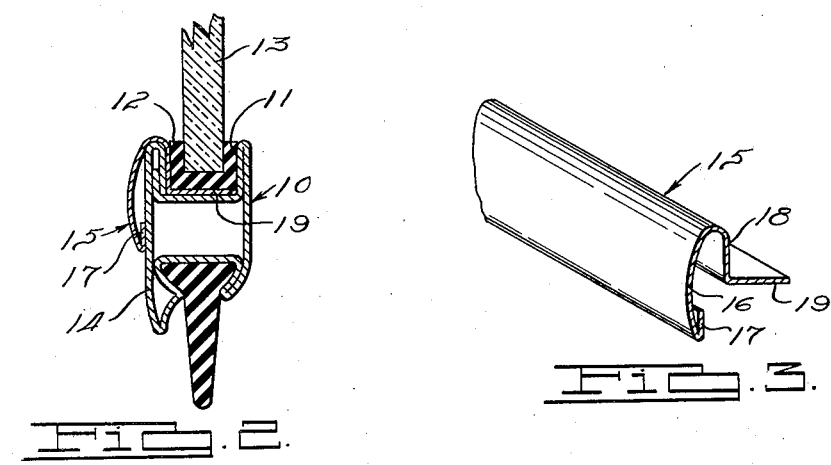
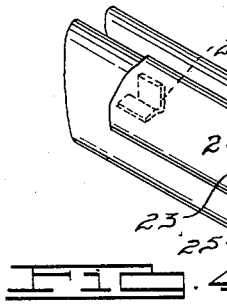
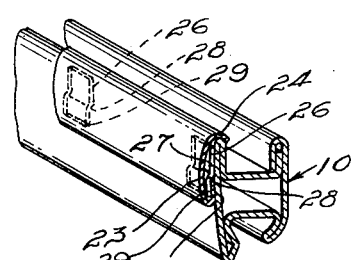
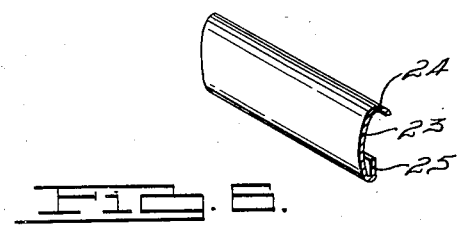
INVENTOR
Albert T. Potter.
BY
Harness, Dickey, Pierce and Hanss
ATTORNEYS.

Patented Oct. 2, 1934

1,975,372

UNITED STATES PATENT OFFICE 1,975,372

WINDSHIELD FRAME

Albert T. Potter, Detroit, Mich., assignor to Ainsworth Manufacturing Company, a corporation of Michigan Application May 19, 1932, Serial No. 612,267

2 Claims. (Cl. 296—84)

The invention relates particularly to windshield frames or the like, and more specifically relates to an ornamental bar or strip for the frame and a method of fastening the strip to the frame.

One object of the invention is to provide an ornamental bar or strip for windshield frames or the like, which may be manufactured inexpensively and readily attached to the frame for ornamental purposes.

Another object of the invention is to provide an ornamental bar or strip of the above mentioned character which is so fastened to the frame that it will not loosen or vibrate as a result of any movement or vibration of the vehicle upon which the frame is utilized.

Another object of the invention is to provide a method of fastening an ornamental bar or strip to a windshield frame or the like by means of which the strip is so held that it will not vibrate or become loosened during any movement or vibration of the vehicle upon which the frame is mounted.

For a better understanding of the invention, reference may be had to the accompanying drawing, forming a part of the specification, wherein:

Figure 1 is a front elevational view of a windshield frame having an ornamental bar or strip, which may be constructed according to one form of the invention;

Fig. 2 is a cross sectional view on a larger scale, taken substantially along the line 2—2 of Fig. 1 and illustrating the manner in which an ornamental strip is assembled with the windshield frame and glass therein according to the form of the invention illustrated in Fig. 1;

Fig. 3 is a fragmentary, perspective view illustrating the ornamental strip shown by Fig. 2, as seen when removed from the windshield frame;

Fig. 4 is a fragmentary, perspective view shown in cross section, of the windshield frame, illustrating an ornamental bar constructed according to another form of the invention, and the manner in which it is fastened to the frame;

Fig. 5 is a view similar to that shown by Fig. 4, illustrating the ornamental bar in its final and operative position;

Fig. 6 is a fragmentary and perspective view of the ornamental strip shown in Figs. 4 and 5, as seen when removed from the windshield frame.

Referring to Figs. 1 and 2, a windshield frame is indicated at 10, and has a channel 11, within which a channel shaped rubber strip 12 may be employed for receiving edge portions of the windshield indicated at 13. As illustrated in Fig. 2, the front side or that side of the frame and windshield at the radiator side of the vehicle upon which the frame may be mounted is indicated at 14, and the present invention is concerned with an ornamental strip or bar which may extend around the front side of the windshield for enhancing the appearance of the vehicle. Preferably this ornamental strip will be chrome plated at least on its exposed surface.

Referring now to Figs. 2 and 3, the ornamental strip mentioned above is indicated at 15 and comprises a laterally bowed body portion 16, a reversely bent lower edge portion 17, a reversely bent upper edge portion 18 and a plane portion 19 projecting from the edge of the last mentioned bent portion. As shown in Fig. 2, the plane portion 19 and a major part of the bent portion 18, are complementary to the base of the channel 11, and the front side thereof, and hence fit snugly in the channel and receive the base and the one side wall of the rubber channel member 12. It is therefore apparent that the strip 15 will be firmly held in position by the glass 13. It will also be noted that the reversely bent portion 18 hooks over the outer leg of the channel of the frame, and that the reversely directed edge portion 17 of the strip contacts with the front wall of the frame. Normally this construction is such that the edge portion 17 is resiliently pressed against the front side of the frame, or in other words the bowed body portion 16 of the strip normally is urged towards the frame. While the entire strip 15 may be chrome plated, preferably only the exposed surface thereof will be so plated, and consequently, the strip provides a chrome plated ornamentation extending around the windshield frame. In practice it probably will be more practical to make the ornamental strip in four sections as indicated at 18, 19, 20 and 21.

In the construction illustrated by Figs. 4, 5 and 6, the ornamental strip comprises a bowed body portion 23 having a hook portion 24 at its upper edge, and a reversely bent portion 25 at its lower edge. For aiding in fastening this strip to the windshield frame, fastening elements 26 may be provided at spaced points along the front side of the frame and each of said elements as shown may comprise a portion 27 welded or otherwise secured to the front wall of the frame, an outwardly curved portion 28 at the lower edge of the plane portion and an outwardly directed portion 29 which initially is directed away from the frame in the manner shown by Fig. 4. The ornamental strip is first hooked over the outer leg of the channel in the frame, as shown by Fig. 4, until the hook portion 25 moves past the outer edge of the portion 29 of the fastening element 26, and then by moving the strip downwardly and fulcruming its hook portion about the outer leg of the channel, the strip and the portion 29 of the fastening element may be moved toward the front side of the frame into their relative positions as shown by Fig. 5. The curved portion 28 of the fastening element is employed to readily allow the portion 29 to be spaced from and in parallelism to the wall of the frame when it has been bent towards the latter. During this movement of the strip and portion 29 of the fastening element, the outer edge portion of the latter moves farther into the space defined by the reversely bent portion 25, and when the parts are finally positioned as shown by Fig. 5, the portion 29 of the fastening element has moved completely into the fold at the lower edge of the ornamental strip and in fact has tensioned the strip downwardly. Accordingly it will be appreciated that the hook portion 24 engaging the leg of the channel, and the bent portion 25 engaging the edge of the portion 29 of the fastening element, are held tightly in such engaging position by tension. This is desirable because movement or vibration of the vehicle will not loosen the ornamental strip or cause it to vibrate relative to the windshield frame. In this construction, the ornamental strip may also be chrome plated at least to the extent of its exposed surface so that the windshield frame may have a chrome plated strip therearound.

It should be appreciated that it will be easier to manufacture an ornamental strip of this character separately of the windshield frame, chrome plate it, and then attach it to the windshield frame, than it would be to chrome plate the front wall of the windshield frame. In either of the constructions provided it is apparent that the ornamental strip is held positively in place against any movement or vibration relative to the windshield frame. Furthermore, it will be appreciated that the strip is held in place under tension and this is very advantageous for the purpose of continually preventing any loosening thereof with respect to the windshield frame. It is also apparent that the ornamental strip may be readily attached or associated with the windshield frame, and that in the construction shown by Figs. 4 and 5, the strip may be attached to the windshield frame even though the glass is already in place. Moreover, it will be appreciated that in either construction any sharp edge of the ornamental strip is concealed and the strip has the appearance of having both edges rounded.

While more than one form of the invention has been illustrated and described in detail, it will be apparent to those skilled in the art that various modifications may be made without departing from the scope of the appended claims.

I claim:

1. In combination, a metal windshield frame or the like having a channel for receiving the shield, and a side wall substantially in the plane of one leg of the channel, a separate ornamental strip extending along said side wall and having a hook-shaped edge lockingly hooked over and engaging one lateral edge of the side wall, the opposite edge of the strip being reversely bent to extend between the body of the strip and the side wall of the frame, and said reversely bent edge engaging said side wall intermediate its edges, and means on the side wall of the frame intermediate its lateral edges and spaced therefrom, for holding the strip in place, said means being disposed under the strip so as to be concealed thereby and comprising an element secured to the side wall of the frame and extending into the fold formed by the reversely bent edge of the strip.

2. In combination, a frame member including a side wall, a channel for receiving the edge of a windshield or the like, an ornamental strip having its opposed edges turned from one side of the strip to provide hook portions, one of said hook portions being adapted to hook over the free edge of one leg of the channel, the other hook portion being adapted to lay flat against the side wall and intermediate the edges thereof, and a bendable fastener lip secured to the side wall and adapted to enter the last-mentioned hook portion and to lie substantially flat against the side wall surface after its entry into such hook portion and when the strip is moved about the connection with the strip and the free edge of the channel leg.

ALBERT T. POTTER.